United States Patent [19]

Boyden

[11] 3,732,373

[45] May 8, 1973

[54] TONE CONTROL CIRCUITS

[76] Inventor: Willis Guild Boyden, 24 Press Avenue, Norwood, Mass. 02062

[22] Filed: Oct. 12, 1971

[21] Appl. No.: 188,229

[52] U.S. Cl. ....................179/1 D

[51] Int. Cl. ....................H03g 5/00

[58] Field of Search ....................179/1 D, 100.1 TC; 333/28 T

[56] References Cited

UNITED STATES PATENTS

| | | | |
|---|---|---|---|
| 2,074,852 | 3/1937 | Nelson | 179/1 D |
| 2,059,389 | 11/1936 | Oura | 179/1 D |
| 2,093,248 | 9/1937 | Oura | 179/1 D |
| 2,264,715 | 12/1941 | Rohr et al. | 179/1 D |
| 2,500,493 | 3/1950 | Holst | 333/28 T |
| 2,680,231 | 6/1954 | Reed | 333/28 T |

*Primary Examiner*—Kathleen H. Claffy
*Assistant Examiner*—Douglas W. Olms

[57] ABSTRACT

A combined tone and volume control circuit in which two ganged potentiometers are used to simultaneously vary the volume of and effect of the tone control on a signal.

1 Claim, 1 Drawing Figure

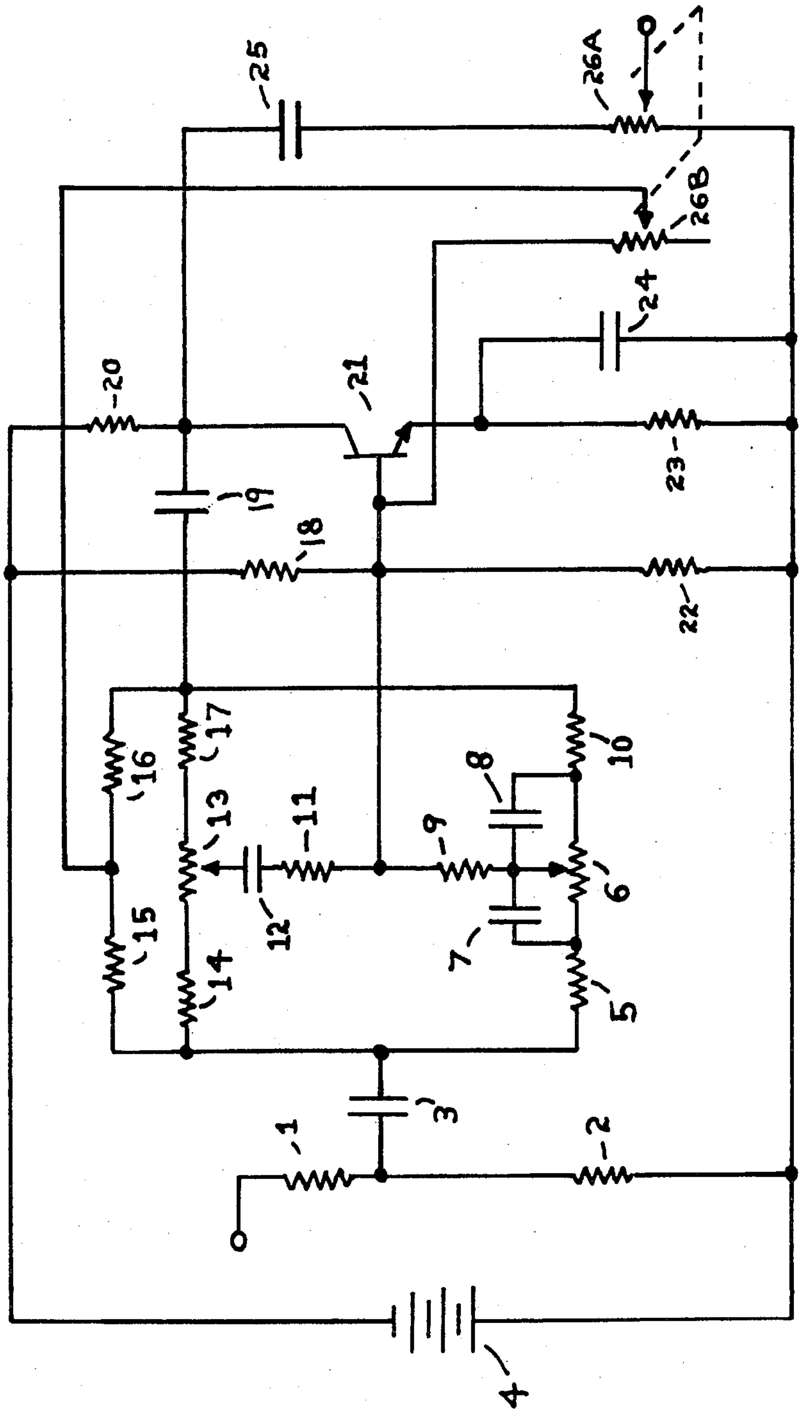
Inventor
Willis Guild Boyden

TONE CONTROL CIRCUITS

One problem with all tone control circuits that increase the gain of the base or highfrequencies above the gain of the mid frequency is that instability can result because of the increased gain. Also as the volume is increased towards the mid frequency power limit of the amplifier it is unnessecary and impossible to increase the base or treble frequencies above this limit and may also cause damage to the speakers, overdriving of the amplifier, instability of the system, etc.

The following invention eliminates the problems mentioned above inherent in the present tone control circuits by decreasing the affect of the tone control circuit on the gain of the amplifier as the total gain of the amplifier is increased by the volume control. This is to be done automatically as the volume control or overall gain control is increased.

The following specifications relate to an embodiment of the basic principle as applied to a modification of the Baxendahl tone control circuit. It is felt, however, that the application of the basic principle of limiting the overdrive of the base and high frequencies as the overall gain of the amplifier is increased towards maximum, to any tone control circuit will improve the performance of the amplifier.

The FIGURE is a symbolic representation of the embodiment described herein.

The battery 4 provides the power for the control circuit. The input signal is introduced to resistor 1. Resistor 2 provides a low sorrce impedance and capacitor 3 decouples the D.C. voltage component from the base of transistor 21. Resistors 5,9,10, capacitors 7,8, and variable resistor 6 comprise th base boost and cut portion of the Baxendahl tone control circuit. Resistors 11,14,17, capacitors 12 and variable resistor 13 comprise the treble boost and cut portion of the Baxendahl tone control circuit. Resistors 22,18, provide bias current for transistor 21. Resistor 23 is the emitter resistor of transistor 21 and capacitor 24 is used to decouple resistor 23. resistor 20 is used as a load for transistor 21. Capacitors 19,25, are used to decouple the D.C. voltage components. The output is taken from the wiper of the volume control pot 26A.

There are two sections to the pot 26. One section is the normal volume control and the other section 26B is connected on the same shaft. Resistors 15,16, will ususally be equal however this is not entirely necessary. If for instance, resistors 15,16, are equal, as the variable resistor 26B approaches zero impedance the gain of the stage, irregardless of frequency, will approach unity, provided, of course, the source impedance is considerably less than the source impedance of the tone control circuit, looking from the base of transistor 21.

As the volume control pot 26A is increased resistors 15,16 are coupled more and more to the circuit as variable resistor 26B decreases, until finally the Baxendahl circuit has no affect on increasing the base and high frequency gain at maximum volume.

The FIGURE shows only one single channel, however, dual channel application of the present embodiment can be achieved by using a quadruple pot with four sections on the same shaft in place of the dual pot 26 with two sections being used as the normal volume control pots and two sections being used as section 26B is used to decouple the tone control circuit. Application of the present embodiment for more than two channels would be achieved by increasing the number of sections on the shaft in a like manner.

I claim:

1. A combined tone and volume control circuit in which two ganged potentiometers are used to simultaneously vary the volume of and effect of the tone control on a signal comprising:
   a. bass and treble tone control circuits, each having first, second, and third terminals, each of the first, second, and third terminals of the bass tone control connected to the corresponding terminal of the treble tone control.
   b. a transistor connected in a common emitter configuration, the base of said transistor is connected to the third terminals of the tone control circuits, the collector of said transistor is connected through one of said ganged potentiometers to the output of the combined tone control circuit, the collector is also connected through a capacitor to the second terminals of the tone control circuits,
   c. two series connected resistors connected between the first and second terminals of the tone control circuits, the junction between said two resistors being connected through the other of said ganged potentiometers to the base of said transistor.

* * * * *